United States Patent [19]

Graves et al.

[11] Patent Number: 4,876,682

[45] Date of Patent: Oct. 24, 1989

[54] SWITCHING TDM DIGITAL SIGNALS

[75] Inventors: Alan F. Graves, Sherwood Park; Paul A. Littlewood; Johannes S. Weiss, both of Edmonton, all of Canada

[73] Assignee: Northern Telecom Limited, Montreal, Canada

[21] Appl. No.: 862,730

[22] Filed: May 13, 1986

[30] Foreign Application Priority Data

Apr. 1, 1986 [CA] Canada ................................ 505501

[51] Int. Cl.⁴ .............................................. H04J 3/22
[52] U.S. Cl. ........................................ 370/66; 370/84
[58] Field of Search .................... 370/58, 66, 68, 84

[56] References Cited

U.S. PATENT DOCUMENTS

| Re. 29,215 | 5/1977 | Carney et al. | 370/84 |
|---|---|---|---|
| 3,632,884 | 1/1972 | Inose et al. | 370/68 |
| 3,694,580 | 9/1972 | Inose et al. | 370/68 |
| 4,068,098 | 1/1978 | Thyselius | 370/66 |
| 4,071,701 | 1/1978 | Leijonhufvud et al. | 370/66 |
| 4,143,242 | 3/1979 | Horiki | 370/84 |
| 4,206,322 | 6/1980 | Lurtz | 370/66 |
| 4,450,557 | 5/1984 | Munter | 370/58 |
| 4,470,139 | 9/1984 | Munter | 370/66 |
| 4,485,468 | 11/1984 | Slana | 370/58 |
| 4,631,720 | 12/1986 | Koeck | 370/84 |

Primary Examiner—Douglas W. Olms
Assistant Examiner—Melvin Marcelo
Attorney, Agent, or Firm—R. John Haley

[57] ABSTRACT

Digital signals are multiplexed in tdm (time division multiplex) frames each consisting of an integral number of sub-frames each consisting of an integral number of sub-sub-frames, whereby the tdm frame, sub-frame, and sub-sub-frame periods are harmonically related. The signals are switched in a hierarchy of time switches which are operated sequentially and cyclically with frame periods corresponding to respective ones of these harmonically related periods, whereby the switches switch services at respective harmonically related bandwidths. The harmonic tdm frame structure and the hierarchical switch arrangement combine to facilitate the switching of many services with various bandwidths using relatively small switches.

16 Claims, 3 Drawing Sheets

SWITCHING TDM DIGITAL SIGNALS

This invention relates to the switching of tdm (time ivision multiplex) digital signals.

Reference is directed to our copending U.S. patent application Ser. No. 797,264 filed Nov. 12, 1986 and entitled "Method of Multiplexing Digital Signals".

In communications systems it is well known to provide tdm digital signals on communications lines, and to effect switching of individual channels among time slots and communications lines using various arrangements of time and space switches. The individual channels are typically 8-bit PCM telephone voice channels sampled with a frequency of 8 kHz and hence having a bit rate of 64 kbps, commonly referred to as DS-0 channels.

It is also known to multiplex such DS-0 channels to produce tdm signals at successively higher bit rates, for example so-called DS-1, DS-2, and DS-3 signals, using various framing, stuffing, and control schemes, and to associate a plurality of DS-0 channels to a digital signal service at a higher bit rate than 64 kbps. For switching such signals it has commonly been necessary to demultiplex them to their constituent DS-0 channels, with subsequent remultiplexing after the switching operation.

The increasing availability of high bandwidth transmission facilities such as optical fibers has resulted in the communication of increasing numbers of channels or services of increasing and multiple bandwidths (bit rates). This presents a considerable problem in switching such signals, in particular due to the size of the switch matrix which has been required. Depending upon the type of switch, the switch matrix size can increase in proportion to the square of the number of channels. Accordingly, the ability to switch increasing numbers of channels of increasing bandwidths is limited by the increase in switch matrix size using known switching arrangements.

An object of this invention is to provide methods and apparatus which enable this limitation to be avoided or reduced.

In accordance with this invention, a time switch is operated with a frame period which corresponds to a sub-frame period of a tdm digital signal to be switched, this sub-frame period being an integral factor of the overall tdm frame period of the digital signal, rather than with the tdm frame period itself. As a result the switch operates to switch services at an integral multiple of the bandwidth associated with the tdm frame. A further result is that the memory requirements, for the data and connection memories, of the switch are greatly reduced, whereby the size and cost of the switch are also reduced.

According to another aspect of this invention there is Provided a method of switching digital signals multiplexed in tdm (time division multiplex) frames having harmonically related frame and sub-frame periods, comprising the steps of cyclically operating a first time switch with a frame period corresponding to one of said harmonically related periods thereby to switch time channels of said digital signals to provide switched services having a first bandwidth; cyclically operating a second time switch with a frame period corresponding to another of said harmonically related periods thereby to switch time channels of said digital signals to provide switched services having a second bandwidth harmonically related to the first bandwidth; and conducting digital signals to, from, and between the switches.

The method preferably further comprises the steps of cyclically operating a third time switch with a frame period corresponding to a further one of said harmonically related periods thereby to switch time channels of said digital signals to provide switched services having a third bandwidth harmonically related to the first and second bandwidths; and conducting digital signals between the third switch and at least one of the first and second switches.

The harmonically related periods are conveniently a tdm frame period of 125 microseconds, a sub-frame period of 5 microseconds, and a sub-sub-frame period of 5/32 microseconds.

The invention further extends to apparatus for switching digital signals multiplexed in tdm (time division multiplex) frames having a plurality of harmonically related frame and sub-frame Periods, the apparatus comprising: first and second time switches; means for coupling digital signals to, from, and between the time switches; and means for operating the time switches with different frame periods corresponding to respective ones of said harmonically related periods thereby to switch the digital signals with different service bandwidths.

The apparatus preferably further comprises a third time switch; means for coupling digital signals between the third time switch and at least one of the first and second time switches; and means for operating the third time switch with a further different frame period corresponding to a further respective one of said harmonically related periods thereby to switch the digital signals with a further different service bandwidth.

The invention thus facilitates the provision of a hierarchy of switches operating with harmonically related frame periods each to switch digital signals with a respective service bandwidth, whereby services at a variety of bandwidths can be switched in an efficient manner.

The invention will be further understood from the following description with reference to the accompanying drawings, in which:

FIG. 1 schematically illustrates a known form of time switch;

Figure 1:
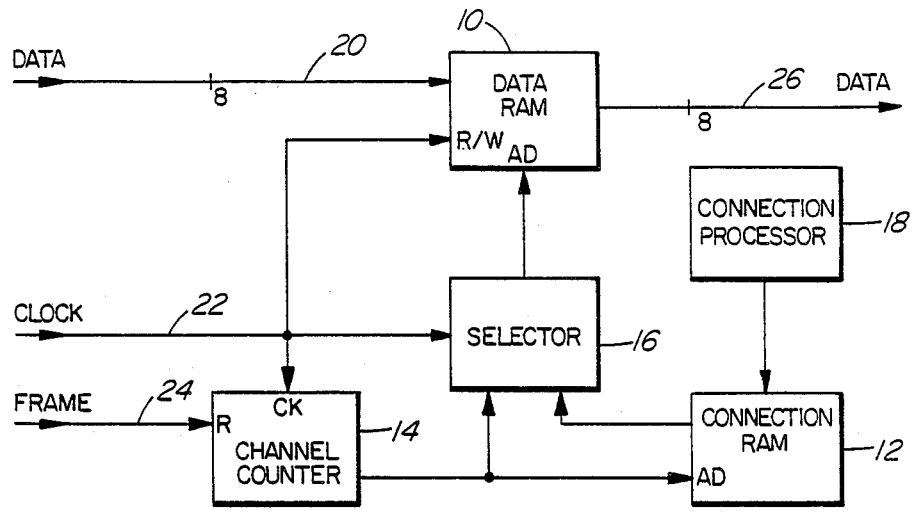

Referring to FIG. 1, there is illustrated a known form of time switch comprising a data RAM (random access memory) 10, a connection memory 12, a channel counter 14, an address selector 16, and a connection processor 18. Incoming tdm data, for example 8-bit parallel PCM (pulse code modulated) data, on a line 20 is stored at locations in the data RAM 10 addressed sequentially and cyclically from the channel counter 14 via the address selector 16, a clock signal on a line 22 incrementing the channel counter 14 via its clock input CK, controlling the data RAM 10 via a read/write control input R/W, and controlling the selector 16 accordingly. The channel counter 14 is synchronized to the tdm frames of data on the line 20 by a frame control signal supplied via a line 24 to a reset input of the channel counter 14. Reading of data from the data RAM 10 to an output line 26 is effected from addresses supplied via the selector 16 from the connection RAM 12, which is sequentially and cyclically addressed by the channel counter 14 to supply connection addresses which have previously been stored therein under the control of the connection processor 18.

The invention stems initially from the recognition that in such a known time switch the service bandwidth switched by the switch is inversely proportional to the repetition period of the frame control signal on the line 24. This is explained below, using for clarity and convenience figures which are used subsequently in the description.

Suppose, for example, that the clock signal on the line 22 has a frequency of 51.2 MHz, corresponding to a data rate on the lines 20 and 26 of $51.2 \times 10^6$ words per second (51.2 Mwps). Such a data rate can be constituted by 6400 channels each having words at a rate of 8 kHz (6400×8 kHz=51.2 MHz) and hence with a frame period of ⅛ kHz or 125 us (125 microseconds). For the 8-bit wide data lines 20 and 26 these correspond to conventional DS-0 or 64 kbps channels. Thus if the frame control signal on the line 24 has a frequency of 8 kHz or a period of 125 us, then the switch of FIG. 1 acts to switch 8-kwps (64 kbps) channels. In this case the channel counter 14 would have 6400 sequentially and cyclically repeated states to provide 13-bit wide addresses, the data RAM 10 would require 6400 storage locations each for an 8-bit wide word, and the connection RAM 12 would require 6400 storage locations each for a 13-bit wide address, with a total memory requirement of 134,400 bits.

Alternatively, the same data rate can be constituted by 256 channels each having words at a rate of 200 kHz (256×200 kHz=51.2 MHz) and hence with a frame period of 1/200 kHz or 5 us. For the 8-bit wide data lines 20 and 26 these correspond to 1.6 Mbps channels. Thus if the frame control signal on the line 24 has a frequency of 200 kHz or a period of 5 us, then the switch of FIG. 1 acts to switch 200 kwps (1.6 Mbps) channels. In this case the channel counter 14 would have 256 states to provide 8-bit wide addresses, the data RAM 10 would require 256 storage locations each for an 8-bit wide word, and the connection RAM 12 would require 256 storage locations each for an 8-bit wide address, with a total memory requirement of 4096 bits.

Furthermore, the same data rate can be constituted by 8 channels each having words at a rate of 6.4 MHz (8×6.4 MHz=51.2 MHz) and hence with a frame period of 1/6.4 MHz or 5/32 us. For the 8-bit wide data lines 20 and 26 these correspond to 51.2 Mbps channels. Thus if the frame control signal on the line 24 has a frequency of 6.4 MHz or a period of 5/32 us, then the switch of FIG. 1 acts to switch 6.4M wps (51.2 Mbps) channels. In this case the channel counter 14 would have 8 states to provide 3-bit wide addresses, the data RAM 10 would require 8 storage locations each for an -8-bit wide word, and the connection RAM 12 would require 8 storage locations each for a 3-bit wide address, with a total memory requirement of 88 bits.

Thus it can be seen that, for the same input and output data rate, the switch can be used to switch channels at different rates under the control of the frame control signal on the line 24, with radically decreasing memory requirements for the data RAM 10 and connection RAM 12 as the period of the frame control signal is reduced. The three examples given above provide service bandwidths of 8 kwps, 200 kwps, and 6.4 Mwps respectively, which are converted into bits per second by multiplying them by the bit width of the words or data lines 20 and 26.

Figure 2:
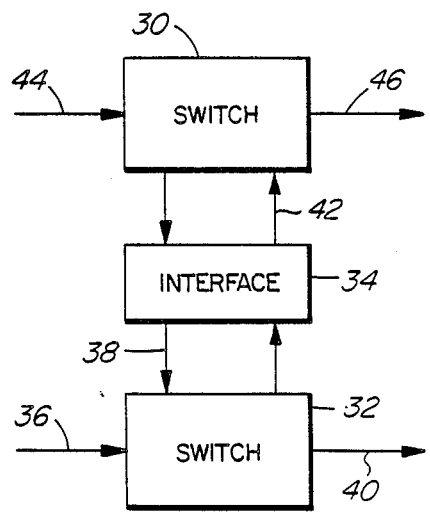
FIG. 2 is a block diagram schematically illustrating a hierarchical switch arrangement.

FIG. 2 illustrates a general elementary form of a hierarchical switch arrangement, which comprises two time switches 30 and 32 and an interface 34 therebetween. The switch 32 has an incoming data path 36, derived for example from a transmission line, and an incoming data path 38 derived from the switch 30 via the interface 34, and has an outgoing data path 40 for example to a transmission line and an outgoing data path 42 to the switch 30 via the interface 34. The switch 30 has incoming and outgoing paths 44 and 46 respectively in addition to the incoming and outgoing paths 42 and 38 respectively. The switches 30 and 32 operate in the manner described above with reference to FIG. 1 with respectively shorter and longer periods of the frame control signal for the respective switch, whereby the switch 30 acts to switch relatively wide bandwidth services or channels and the switch 32 acts to switch relatively narrow bandwidth services or channels.

Thus for example a wide bandwidth service on the path 44 can be switched directly through the switch 30 to the path 46, or, if it is constituted by a plurality of multiplexed narrower bandwidth services which are to be individually switched by the switch 30, to the path 38 and the narrower bandwidth services can be switched individually by the switch 32. Similarly, narrow bandwidth services incoming to the switch 32 can be switched to the path 40, or to the path 42 for further switching as a multiplexed wider bandwidth service by the switch 30.

The splitting of a switching arrangement into two or more hierarchical levels as described above considerably facilitates the switching of data having various predetermined service bandwidths, and can also be used to facilitate the provision and switching of services having arbitrary bandwidths by association of a plurality of individual channels on one or more of the data paths such as the paths 36 and 44 in FIG. 2.

It is observed that although FIG. 2 shows only two hierarchical levels of switching, this may obviously be extended in a similar manner to three or more levels. It is also observed that in FIG. 2 each switch 30 or 32 has a plurality of incoming and outgoing data paths, in contrast to the single incoming and outgoing data paths in FIG. 1. The plurality of paths may be combined into a single path by multiplexing or, more desirably, time switches which can accommodate a plurality of incoming and outgoing data paths can be used in place of the simplest form of time switch shown in FIG. 1. Known examples of such time switches are the matrixed time switch known for example from Munter U.S. Pat. No. 4,470,139 dated Sept. 4, 1984 and the commutated time switch described in Munter U.S. Pat. No. 4,450,557 dated May 22, 1984.

In the arrangement of FIG. 2, the interface 34 serves to convert digital signals between the tdm frame format handled by the switch 30 and that handled by the switch 32. If known tdm frame formats are used on the data paths 36 to 46, the interface 34 must be a complex arrangement of multiplexing, demultiplexing, stuffing, and destuffing equipment. The need for such a complex interface 34 detracts from the elegance and simplicity of the hierarchical switching arrangement. This need can be avoided by using harmonically related tdm framing formats on the data paths 36 to 46, for example in the manner described below, whereby the interface 34 can be constituted by simple buffers and retiming latches, or even dispensed with altogether. Thus the use of such tdm framing formats considerably facilitates the hierarchical switch arrangement.

Figure 3:
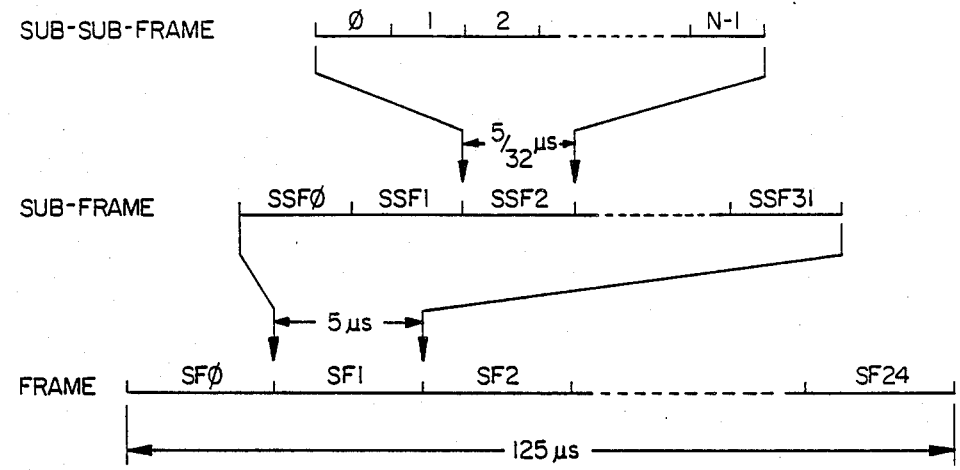
FIGS. 3 and 4 are alternative forms of illustration of a time division multiplex (tdm) frame of a digital signal which is Particularly suitable for switching using a hierarchical switch arrangement in accordance with the invention.

Referring to FIG. 3, the tdm frame illustrated by way of example therein has a duration or frame period of 125 us. This frame is constituted by 25 sub-frames SFO to SF24 each of which has a duration or sub-frame period of 5 us. Thus there is a harmonic relationship between the sub-frame and frame periods, whereby an integral number of sub-frames constitute one frame. Each sub-frame is constituted by 32 sub-sub-frames SSFO to SSF31 each of which has a duration or sub-sub-frame period of 5/32 us. Thus again there is a harmonic relationship between sub-sub-frame and sub-frame periods, whereby an integral number of sub-sub-frames constitute one sub-frame. Each sub-sub-frame is constituted by N words 0 to N-1, N being an integer (N=8 in the embodiment of the invention described below), which are multiplexed in a word-interleaved manner in the sub-sub-frame. Each word comprises an arbitrary number of, for example 8, bits. Frame, sub-frame, and sub-sub-frame synchronization is facilitated by synchronization words (not represented) for example throughout sub-sub-frame SSFO of sub-frame SFO of each frame.

Figure 4:
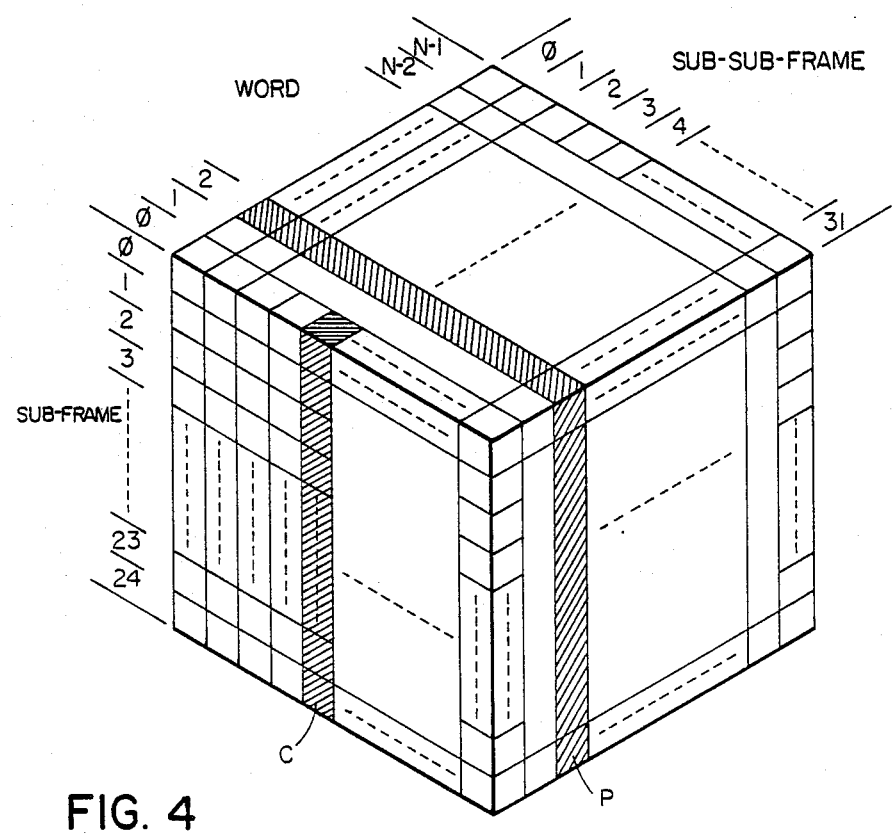

In order to illustrate more clearly the manner in which data channels in such a tdm frame format are switched in accordance with this invention, this same tdm frame format is illustrated in an alternative manner in FIG. 4. More particularly, FIG. 4 represents the tdm frame format in the form of a parallelepiped constituted by individual cubes each of which represents one word in the frame. The parallelepiped is 25 cubes high, corresponding to the 25 sub-frames in each frame, whereby each of the 25 horizontal layers of the parallelepiped represents a respective sub-frame.

From the left-back to the right-front as illustrated in FIG. 4, the parallelepiped is divided into 32 vertical planes corresponding to the 32 sub-sub-frames of each sub-frame, whereby each horizontal layer or sub-frame can be seen to be divided into 32 sub-sub-frames. From the left-front to the right-back as illustrated, the parallelepiped is divided into N vertical planes 0 to N-1 corresponding to the N words in each sub-sub-frame.

Now the tdm frame can be visualized as being constituted by a scanning of all of the cubes in the parallelepiped in turn, starting at the top-left-front (word 0, sub-sub-frame 0, sub-frame 0), proceeding first to the top-left-back (word N-1, sub-sub-frame 0, sub-frame 0), then repeating this scan in a parallel manner for sub-sub-frames 1 to 31 of sub-frame 0 until this entire layer has been scanned, and then repeating the same scanning sequence for all of the other horizontal layers or sub-frames 1 to 24, finally reaching the bottom-right-back corner of the parallelepiped. The time taken to scan N words from the front to the back of the Parallelepiped is the sub-sub-frame period of 5/32 us, the time taken to scan all of the words in one horizontal layer is the sub-frame period of 5 us, and the time taken to scan all of the words in the parallelepiped is the frame period of 125 us.

It should be noted that it is the harmonic relationship of the sub-sub-frame, sub-frame, and frame periods which makes the illustration in FIG. 4 possible; without such a harmonic relationship, it would be impossible to represent the tdm frame in this manner.

Figure 5:
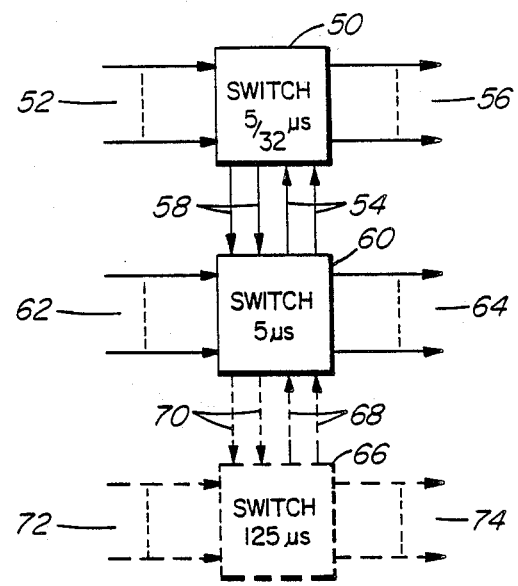
FIG. 5 is a block diagram schematically illustrating a hierarchical switch arrangement for switching digital signals of the form illustrated in FIGS. 3 and 4.

FIG. 5 illustrates a hierarchical switch arrangement for switching signals having the tdm frame format of FIGS. 3 and 4, comprising switches 50 and 60 shown in full lines and, optionally, a switch 66 shown in broken lines. The arrangement is similar to that of FIG. 2, except that as a result of the harmonic tdm frame format the interface 34 of FIG. 2 is dispensed with, data signals being coupled between the switches via simple buffers and retiming latches which are not shown separately.

The switch 50 has a plurality of incoming data paths 52 and 54 and a like plurality of outgoing data paths 56 and 58, each of which data paths carries digital signals with the tdm frame format described above with reference to FIGS. 3 and 4, with for example N=8. This switch 50 is for example a commutated time switch as described in Munter U.S. Pat. No. 4,450,557 already referred to, with as many commutation ways at its input and output as there are incoming or outgoing data paths. The data paths 54 and 58 lead respectively from and to the switch 50, whereas the data paths 52 and 56 are constituted by transmission paths. For example, the signals of three such paths 52 and 56 may be multiplexed together whereby these three paths are constituted by a 1.2288 Gbps fiber optic transmission link in the manner described and claimed in Carlton U.S. patent application Ser. No. 828,800 filed Feb. 12, 1986 and entitled "Scrambling Data Signals". The switch 50 is operated with a frame control signal at a frequency of 6.4 MHz, corresponding to a frame of 5/32 us, which is the sub-sub-frame period in the tdm frame format of FIGS. 3 and 4.

The switch 60 is for example a full matrix time switch as described in Munter U.S. Pat. No. 4,470,139 already referred to. This switch, in addition to having the incoming and outgoing data Paths 58 and 54 respectively, also has incoming and outgoing data paths 62 and 64 respectively, the signals on these paths all having the tdm frame format described above with N=8. This switch is operated with a frame control signal of 200 kHz, corresponding to a frame period of 5 us, which is the sub-frame period in the tdm frame format.

In addition, with the optionally provided switch 66 shown in broken lines, the switch 60 may have incoming and outgoing data Paths 68 and 70 respectively, the switch 66 also having incoming and outgoing data paths 72 and 74 respectively and being operated with a frame control signal of 8 kHz, corresponding to the overall frame Period of 125 us. In this case the signals on the data paths 68 to 74 have a tdm frame format which is harmonically related to that of the signals on the data paths 52 to 58, 62, and 64, and which conveniently is the same as that described with reference to FIGS. 3 and 4 but with a lower value of N, for example with N=1. In this respect it is also noted that the tdm frame format on the other data paths could have differing values of N, for example the format on the data paths 52 and 56 could alternatively have a higher value of N than that on the data paths 54 and 58 and/or 62 and 64.

The operations of the switches 50, 60, and 66 on the tdm framed data signals is now described, referring to the tdm frame format illustration in FIG. 4.

The switch 50 operates with a frame control signal period of 5/32 us, so that words in the tdm frame which occur every 5/32 us are routed via the same path through the switch 50. As the sub-sub-frame period of the tdm frame format is 5/32 us, these words will all have the same word number in the successive sub-sub-frames and sub-frames of the frame, so that they together constitute a vertical plane of cubes or words in the tdm frame format as illustrated in FIG. 4, such as the plane P (word number 2) emphasized by hatching in FIG. 4. Thus the switch 50 serves to switch such planes of words among its various data paths. As each such plane comprises 25×32=800 words in the overall frame period of 125 us, the switch 50 serves effectively to switch channels or services having a wide bandwidth of 800 words per 125 us, or 6.4 Mwps, or 51.2 Mbps for 8-bit words.

The switch 60 operates with a frame control signal period of 5 us, so that words in the tdm frame which occur every 5 us are routed via the same path through the switch 60. As the sub-frame period of the tdm frame format is 5 us, these words will all have the same combination of word and sub-sub-frame numbers of the frame. In other words, they will be above one another in successive horizontal layers or sub-frames in the illustration of FIG. 4, as shown for example for the hatched column C in FIG. 4. Thus the switch 60 serves to switch such columns of words among its various data paths. As each such column comprises 25 words in the overall frame period of 125 us, the switch 60 serves effectively to switch channels or services having a bandwidth of 25 words per 125 us, or 200 kwps, or 1.6 Mbps for 8-bit words.

The switch 66 operates at the frame period of 125 us, and thus switches individual words among its data paths. Thus the switch 66 serves to switch channels or services having a bandwidth of 1 word per 125 us, or 8 kwps, or 64 kbps for 8-bit words, i.e. DS-0 channels. The switch 66 thus corresponds to a so-called DS-0 or 64 kbps cross-connect.

As the tdm frame formats on the data paths to and from the switches are all either the same or are harmonically related, the interconnecting data paths among the switches can be arbitrarily changed to provide different hierarchical switch arrangements.

Figure 6:
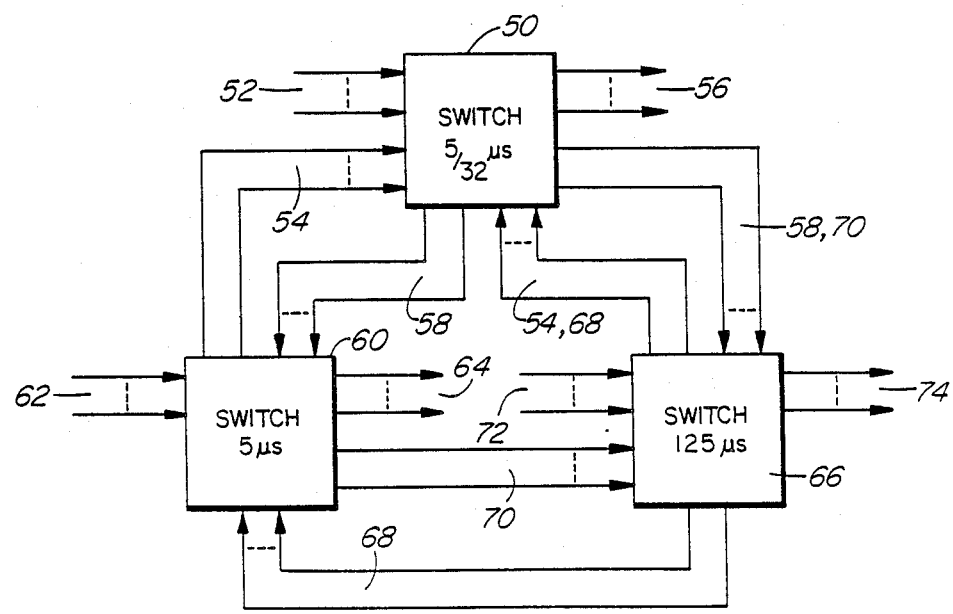
FIG. 6 illustrates an alternative form of hierarchical switch arrangement.

FIG. 6 illustrates an alternative hierarchical switch arrangement, in which each switch is connected to each other switch via data paths. The same references are used in FIGS. 5 and 6 to denote similar Parts. Other hierarchical switch arrangements may similarly be provided.

Numerous other modifications, variations, and adaptations may be made to the particular embodiments of the invention described above without departing from the scope of the invention as defined in the claims. In particular, it is observed that the invention is not limited to the particular number of bits per word, frame, sub-frame, and sub-sub-frame periods, numbers of words and channels per frame, or types of switch which have been described here.

What is claimed is:

1. A method of switching digital signals multiplexed in tdm (time division multiplex) frames having harmonically related frame and sub-frame periods, comprising the steps of cyclically operating a first time switch with a frame period corresponding to one of said harmonically related periods thereby to switch time channels of said digital signals to provide switched signals having a first bandwidth; cyclically operating a second time switch with a frame period corresponding to another of said harmonically related periods thereby to switch time channels of said digital signals to provide switched signals having a second bandwidth harmonically related to the first bandwidth; and conducting digital signals to, from, and between the switches.

2. A method as claimed in claim 1 of switching digital signals multiplexed in tdm frames having harmonically related frame, sub-frame, and sub-sub-frame periods, further comprising the steps of cyclically operating a third time switch with a frame period corresponding to a further one of said harmonically related periods thereby to switch time channels of said digital signals to provide switched signals having a third bandwidth harmonically related to the first and second bandwidths; and conducting digital signals between the third switch and at least one of the first and second switches.

3. A method as claimed in claim 1 wherein one of the switches is operated with a frame period of 125 microseconds.

4. A method as claimed in claim 1 wherein one of the switches is operated with a frame period of 5 microseconds.

5. A method as claimed in claim 1 wherein one of the switches is operated with a frame period of 5/32 microseconds.

6. A method as claimed in claim 2 wherein one of the switches is operated with a frame period of 125 microseconds.

7. A method as claimed in claim 2 wherein one of the switches is operated with a frame period of 5 microseconds.

8. A method as claimed in claim 2 wherein one of the switches is operated with a frame period of 5/32 microseconds.

9. Apparatus for switching digital signals multiplexed in tdm (time division multiplex) frames having a plurality of harmonically related frame and sub-frame periods, the apparatus comprising: first and second time switches; means for coupling digital signals to, from, and between the time switches; and means for operating the time switches with different frame periods corresponding to respective ones of said harmonically related Periods thereby to switch the digital signals with different bandwidths.

10. Apparatus as claimed in claim 9 and further comprising:
 a third time switch;
 means for coupling digital signals between the third time switch and at least one of the first and second time switches; and
 means for operating the third time switch with a further different frame period corresponding to a further respective one of said harmonically related periods thereby to switch the digital signals with a further different bandwidth.

11. Apparatus as claimed in claim 9 wherein the means for operating is arranged for operating the switches with frame periods selected from 125 microseconds and sub-multiples thereof.

12. Apparatus as claimed in claim 9 wherein at least one of the time switches comprises a matrixed time switch.

13. Apparatus as claimed in claim 9 wherein at least one of the time switches comprises a commutated time switch.

14. Apparatus as claimed in claim 10 wherein the means for operating is arranged for operating the switches with frame periods selected from 125 microseconds and sub-multiples thereof.

15. Apparatus as claimed in claim 10 wherein at least one of the time switches comprises a matrixed time switch.

16. Apparatus as claimed in claim 10 wherein at least one of the time switches comprises a commutated time switch.

* * * * *